(12) United States Patent
Martwick

(10) Patent No.: US 6,718,407 B2
(45) Date of Patent: *Apr. 6, 2004

(54) MULTIPLEXER SELECTING ONE OF INPUT/OUTPUT DATA FROM A LOW PIN COUNT INTERFACE AND A PROGRAM INFORMATION TO UPDATE A FIRMWARE DEVICE FROM A COMMUNICATION INTERFACE

(75) Inventor: Andrew W. Martwick, Folsom, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/410,133

(22) Filed: Sep. 30, 1999

(65) Prior Publication Data

US 2003/0041182 A1 Feb. 27, 2003

(51) Int. Cl.$^7$ .......................... G06F 13/20; G06F 9/445

(52) U.S. Cl. .......................... 710/51; 710/31; 711/103; 717/168

(58) Field of Search ................. 717/168–173; 710/36, 51; 709/217–219; 713/1, 2, 100; 711/103

(56) References Cited

U.S. PATENT DOCUMENTS

| 5,805,882 A | * | 9/1998 | Cooper et al. ............... 711/166 |
| 5,968,141 A | * | 10/1999 | Tsai ............................ 710/14 |
| 6,032,221 A | * | 2/2000 | Hongo ........................ 711/103 |
| 6,202,123 B1 | * | 3/2001 | Mukai et al. ................ 711/103 |
| 6,266,810 B1 | * | 7/2001 | Tanaka et al. ............... 717/173 |
| 6,343,617 B1 | * | 2/2002 | Tinsley et al. .............. 137/486 |

* cited by examiner

*Primary Examiner*—Ilwoo Park
(74) *Attorney, Agent, or Firm*—Blakely, Sokoloff, Taylor & Zafman LLP

(57) ABSTRACT

The present invention is a method and apparatus to self update a firmware device. A communication interface receives programming information. A parser coupled to the communication interface to parse the programming information into control commands and program data.

18 Claims, 4 Drawing Sheets

MULTIPLEXER SELECTING ONE OF INPUT/OUTPUT DATA FROM A LOW PIN COUNT INTERFACE AND A PROGRAM INFORMATION TO UPDATE A FIRMWARE DEVICE FROM A COMMUNICATION INTERFACE

BACKGROUND

1. Field of the Invention

This invention relates to microprocessors. In particular, the invention relates to firmware.

2. Description of Related Art

Non-volatile memories (e.g., flash memories) are increasingly important in many microprocessor applications. One particular use of non-volatile memories is in a firmware hub (FWH). A FWH provides an integrated mechanism to enable security-enhanced platform infrastructure in modern microprocessor platforms. The non-volatile memory in a FWH is typically used for platform code and data storage.

A flash memory needs to be erased and programmed to store code and data. Traditional techniques to program flash memories include mass programming at the manufacturing facility and remote programming with the aid of the host processor.

Programming at the manufacturing facility involves the use of programming and test equipment. For applications that require frequent updates, this programming approach is not practical. Remote programming by a host processor requires an interface with the host to allow the host or a special processor to carry out the programming sequence. In many applications, the intervention by a host processor is not desirable. For example, if the flash memory itself is used as a boot device from which the host processor obtains the boot code, it is impossible for the host processor to program its own boot code.

Therefore, there is a need to have a firmware device having a self-update ability to program itself without an external device.

SUMMARY

The present invention relates to a method and apparatus to self update a firmware device. The apparatus comprises a communication interface to receive programming information and a parser to parse the programming information into control commands and program data. The parser is coupled to the communication interface.

BRIEF DESCRIPTION OF THE DRAWINGS

The features and advantages of the present invention will become apparent from the following detailed description of the present invention in which.

DESCRIPTION

The present invention is a method and apparatus for self-updating a firmware device. The update is performed autonomously without the intervention of an external processor. A communication interface circuit receives the serial data containing the program information. A parser decodes the program information and generates control commands to a control logic circuit. A read buffer stores the program data. The control logic circuit includes a erase control circuit and a write control circuit. The parser includes a state machine that parses the program information and extract program parameters and program data. The state machine generates control signals and/or control commands to the erase and write control circuits to erase and write the firmware device. By incorporating the self-update controller to control the firmware device, the technique provides a mechanism to update the firmware device without an external processor.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
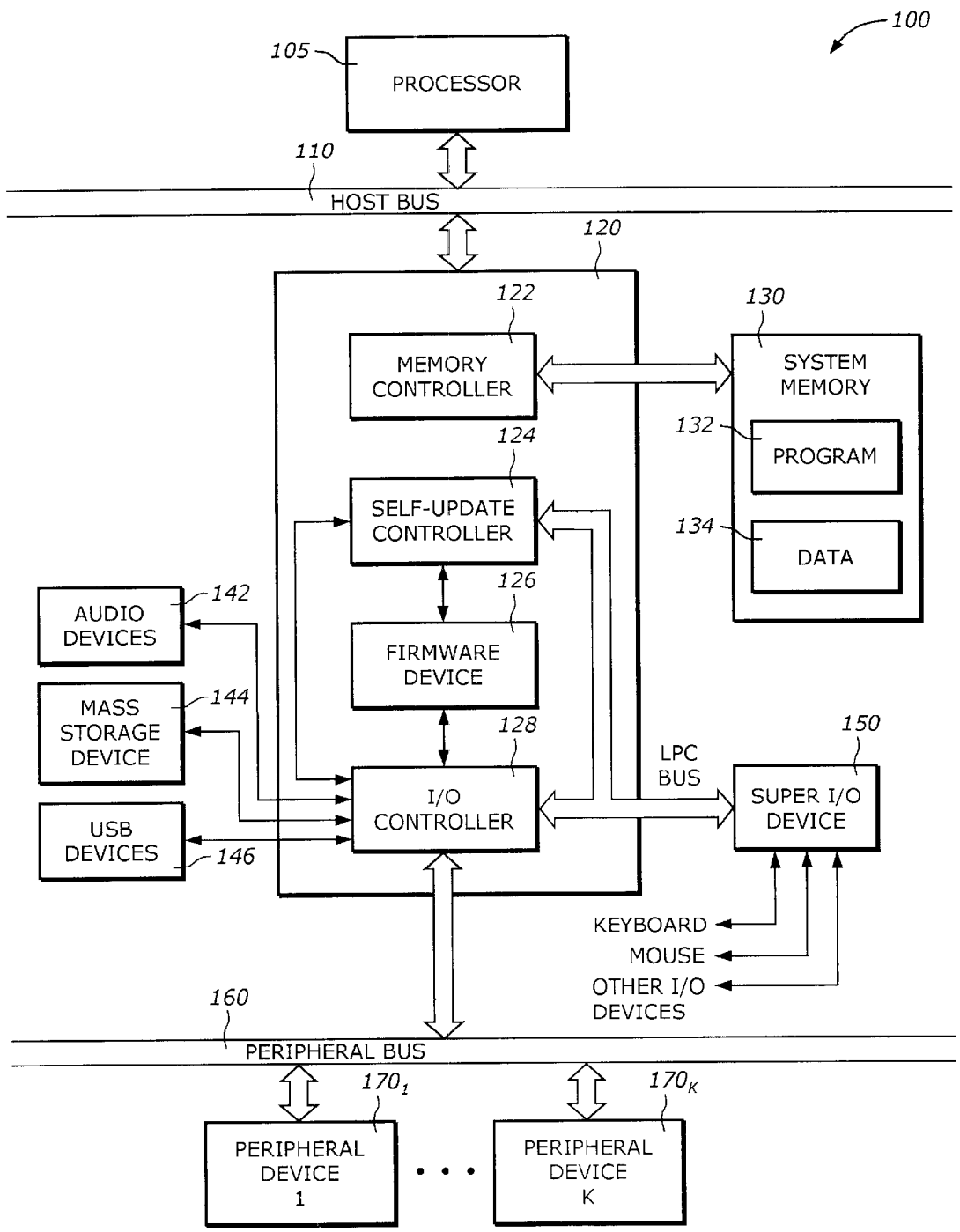
FIG. 1 is a diagram illustrating a computer system in which one embodiment of the invention can be practiced.

FIG. 1 is a diagram illustrating a computer system 100 in which one embodiment of the invention can be practiced. The computer system 100 includes a processor 105, a host bus 110, a host bridge chipset 120, a system memory 130, an audio device 142, a mass storage device 144, an universal serial bus (USB) device 146, a super input/output (I/O) device 150, a peripheral bus 160, and K peripheral devices $170_1$ to $170_K$.

The processor 105 represents a central processing unit of any type of architecture, such as complex instruction set computers (CISC), reduced instruction set computers (RISC), very long instruction word (VLIW), explicitly parallel instruction set computing (EPIC), or hybrid architecture. The invention could be implemented in a multiprocessor or single processor computer system.

The host bridge chipset 120 includes a number of interface circuits to allow the host processor 105 access to the system memory 130 and the peripheral bus 160. The host bridge chipset 120 includes a memory controller 122, a self-update controller 124, a firmware device 126, and an I/O controller 128. The memory controller 122 provides an interface to the system memory 130. The self-update controller 124 controls the self updating of the firmware device 126 autonomously, i.e., without the intervention of an external processor such as the host processor. The firmware device 126 is a non-volatile memory to store firmware such as program and code. In one embodiment, the non-volatile memory is a flash memory. The I/O controller 128 provides control of I/O functions. The I/O controller 128 provides interface to the audio device 142, the mass storage device 144, the USB device 146, and the super I/O device 150. Other I/O devices may also be controlled by the I/O controller 128.

The system memory 130 represents one or more mechanisms for storing information. For example, the system memory 130 may include non-volatile or volatile memories. Examples of these memories include flash memory, read only memory (ROM), or random access memory (RAM). The system memory 130 stores a program 132 and a data 134. Of course, the system memory 130 preferably contains additional software (not shown), which is not necessary to understanding the invention.

The audio device 142 includes audio equipment or component such as speakers, microphones, and other audio peripherals. In one embodiment, the audio device 142 includes the audio codec AC'97.

The mass storage device 150 includes CD ROM, floppy diskettes, and hard drives. The mass storage device 150 stores non-volatile information such as programs or data. The mass storage device 150 provides a mechanism to read machine-readable media. When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The USB device 146 includes devices that are compatible with the USB standards such as camera, image capture, encoder, decoder, scanner, etc. The super I/O device 150 provides interfaces to a number of I/O functions and devices such as keyboard, mouse, tablet digitizer, track-ball, etc. The super I/O device 150 interfaces to the I/O controller 128 and the self-update controller 124 via a Low Pin Count (LPC) interface bus.

The peripheral bus 160 provides bus interface to the peripheral devices $170_1$ to $170_K$. In one embodiment, the peripheral bus 160 is the peripheral component interconnect (PCI) bus. The peripheral devices $170_1$ to $170_K$ include a network interface device, a modem, a printer controller, etc.

Figure 2:
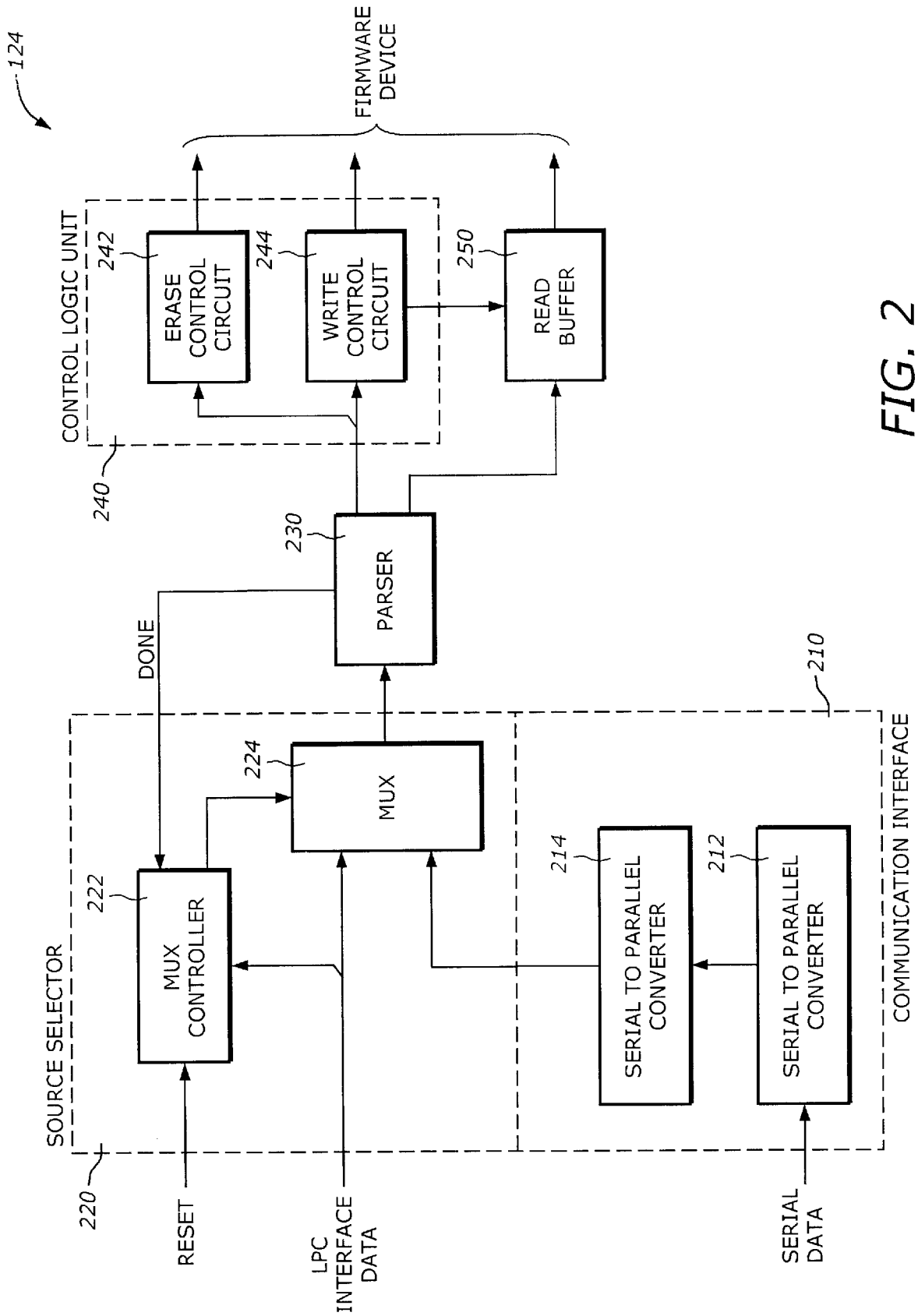
FIG. 2 is a diagram illustrating a self-update controller according to one embodiment of the invention.

FIG. 2 is a diagram illustrating a self-update controller 124 according to one embodiment of the invention. The self-update controller 124 includes a communication interface 210, a source selector 220, a parser 230, a control logic circuit 240, and a read buffer 250.

The communication interface 210 provides an interface to a serial data stream. The serial data may come from a remote device via a modem, or from a test or programming equipment. The serial data contains the programming information to update the firmware device. The programming information includes the self-update identifier, program parameters, and program data. The self-update identifier is a code to inform the self-update controller that the serial data contains the update information. The program parameters include parameters that are needed for the updating. These parameters may include the block size, the number of bytes to be written to the firmware device, the erase block addresses, the write block addresses, etc. The program data are the update data to be written to the firmware device. The update data may include the boot code in a Basic Input/Output System (BIOS), a specific routine, a device driver, an exception handler, a set of data structures, or any other information that needs to be updated.

The communication interface 210 includes a receiver interface 212 and a serial-to-parallel converter 214. The receiver interface 212 provides interface function to receive the serial data. Examples of interface functions include level translation (e.g., voltage shifting from 12V to 5V), data stripping and error detection. These interface functions may not be needed if the serial data are processed by a dedicated communication device such as the legacy serial communication interface device. The serial-to-parallel converter 214 converts the serial data stream into parallel data. The parallel data may be of any size comparable with the parser. Examples of the parallel data sizes include four bits, eight bits, or sixteen bits.

The source selector 220 selects the source for the input to the parser 230. There are essentially two sources: the parallel data from the communication interface 210 and the I/O interface data from the LPC bus. The source selector 220 includes a multiplexer controller 222 and a multiplexer 224. The multiplexer 224 is a two-to-one data selector to select one of the LPC interface data and the parallel data. The LPC interface data contains information for a normal operation. The parallel data contains the program information that is used to update the firmware device. The multiplexer controller 222 controls the selection of the data. The multiplexer controller 222 receives a reset signal from a system reset circuit and some control signal from the LPC interface data. In one embodiment, when the reset signal is activated, the multiplexer controller 222 generates a select signal to the multiplexer 224 to select the program information. The multiplexer controller 222 has a latching element for the select signal that remains stable during the time the parser 230 receives the program information. When the parser completes the update operation, it generates a completion signal (e.g., DONE) to the multiplexer controller 222 so that the select signal can be reversed forcing the multiplexer 224 to switch to the LPC interface data for a normal operation.

The parser 230 decodes the data provided by the multiplexer 224. The parser 230 includes a state machine that generates control commands to the control logic circuit 240 and the read buffer 250. The state machine will be described later in FIG. 3.

The control logic circuit 240 includes an erase control circuit 242 and a write control circuit 244. The erase control circuit 242 generates signals to erase the firmware device. The write control circuit 244 generates signals to program or write the firmware device.

The read buffer 250 stores the program data received from the communication interface 210 and forwarded by the parser 230. The read buffer 250 is a local memory to buffer the program data which will be written to the firmware device under the control of the write control circuit 244. The read buffer 250 may be implemented by a first-in-first-out (FIFO) or a static random access memory (RAM). The size of the read buffer 250 is sufficient to store the program data for the corresponding block in the firmware device.

Figure 3:
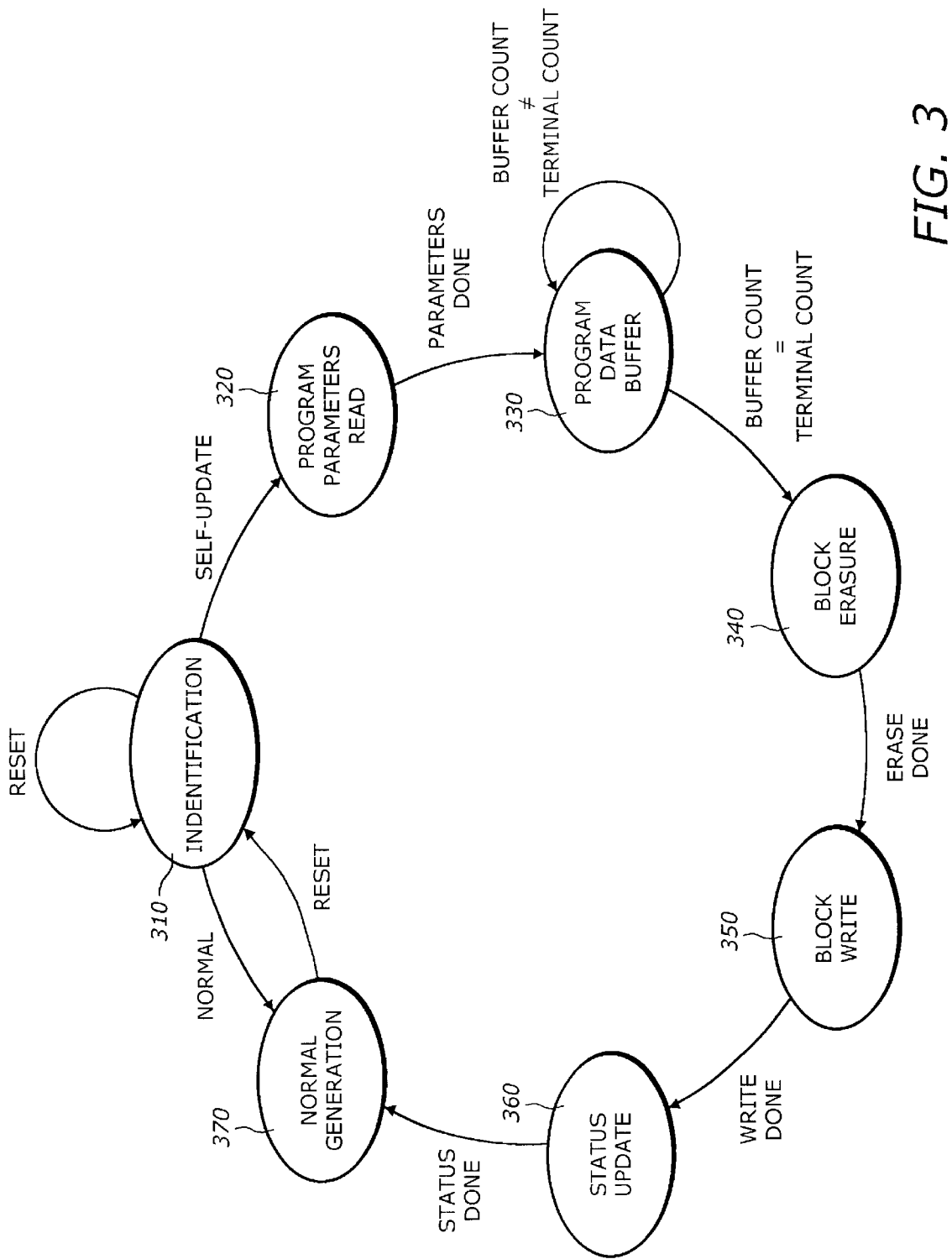
FIG. 3 is a diagram illustrating a state diagram of a command parser according to one embodiment of the invention.

FIG. 3 is a diagram illustrating a state diagram 300 of the parser 230 shown in FIG. 2 according to one embodiment of the invention. The state diagram 300 includes an identification state 310, a program parameters read state 320, a program data buffer state 330, a block erasure state 340, a block write state 350, a status update state 360, and a normal operation state 370.

The identification state 310 parses the input data to the parser 230 (shown in FIG. 2) and identifies if the data contains a self-update identifier. If the data contains the self-update identifier, the state machine 300 transitions from the identification state 310 to the program parameters state 320. Otherwise, the state machine transitions to the normal operation state 370.

In the program parameters read state 320, the state machine 300 reads the program information and extract the program parameters based on a known protocol and/or format. Examples of the program parameters include size of program data, erase block addresses, write block addresses. In one embodiment, the state machine 300 deposits the erase block address in the erase control circuit 242 (in FIG. 2), the write block address in the write control circuit 244 (in FIG. 2), and the program data size in a terminal count register.

After the program parameters are obtained, the state machine 300 transitions to the program data buffer state 320. In the program data buffer state 320, the state machine 300 stores the program data in the stream of program information received from the source selector 220 (in FIG. 2) to the read buffer 250 (in FIG. 2). If the read buffer 250 is a FIFO, the state machine 300 writes to the FIFO while incrementing a FIFO counter. When the FIFO counter reaches the maximum count that matches the program data size stored in the terminal count register, the storing of the program data is stopped, and the state machine proceeds to the block erasure state 340.

In the block erasure state 340, the state machine 300 perform the block erasure operation. The state machine 300 generates control signals to the erase control circuit 242 (in FIG. 2) to erase the firmware device at the specified erase block address.

After the erasure is completed, the state machine 300 transitions to the block write state 350. In the block write state 350, the state machines 300 generates control signals to the write control circuit 244 (in FIG. 2) to write the data in the read buffer 250 (in FIG. 2) to the firmware device at the specified write block address.

After the writing is completed, the state machine 300 transitions to the status update state 360. In the status update 360, the state machines 300 updates the status of the update in a status register. This status register can be later read by an external device such as the host processor 105 (in FIG. 1) or the I/O controller 128 (in FIG. 1). The status may include information about the success of the update, the number of bytes to be updated, the specific block addresses for update, or any other relevant information. At the end of the status update state 360, the state machine 300 generates a DONE signal to the source selector 220 (in FIG. 2) to signal that the update has been completed.

After the status is updated, the state machine 300 transitions to the normal operation state 370. In the normal operation state 370, the state machine 300 receives the LPC interface data and proceeds to perform normal operation. In the normal operation state 370, if the reset signal is activated, the state machine transitions back to the identification state 310 to prepare for another update if necessary.

Figure 4:
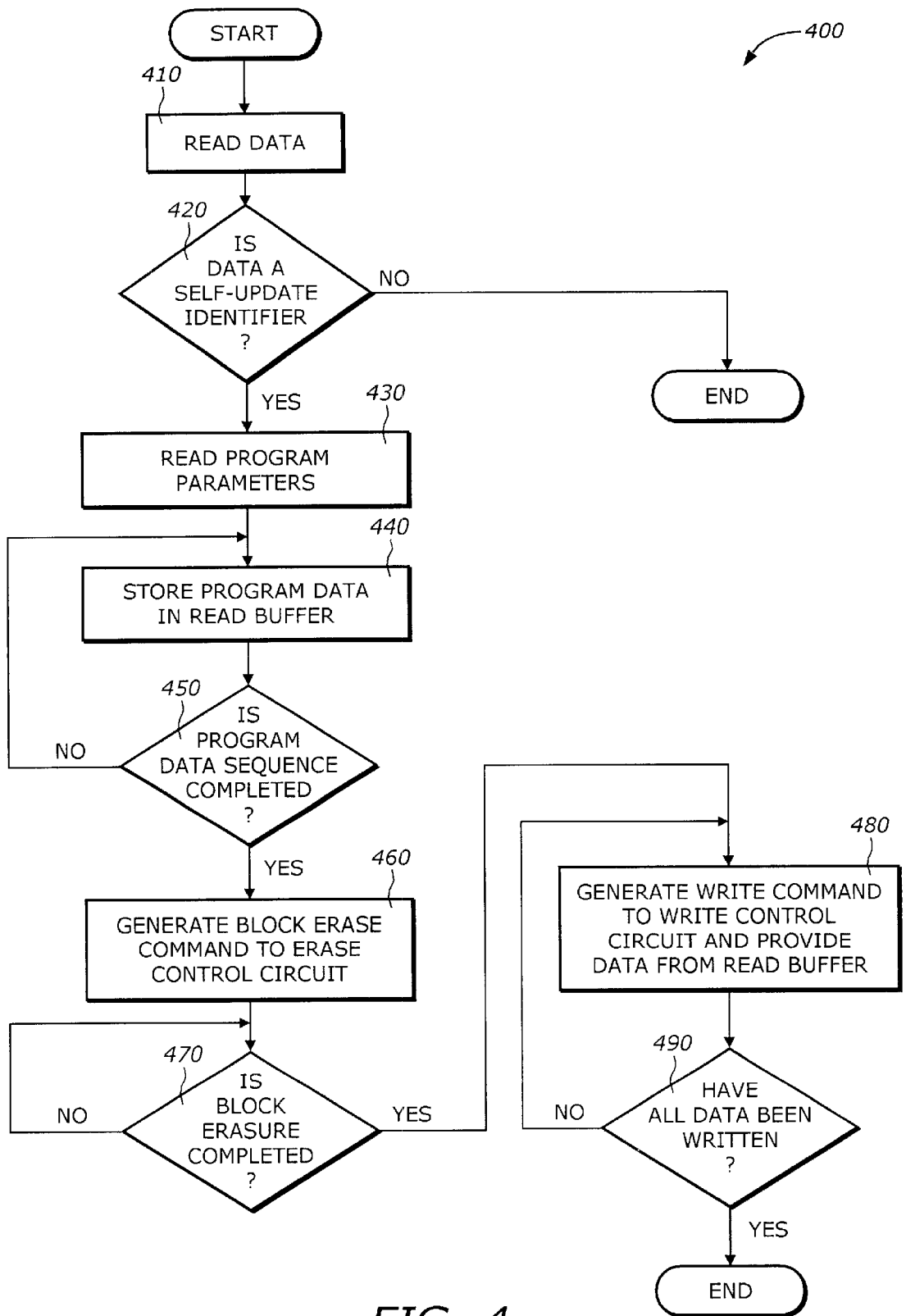
FIG. 4 is a flowchart illustrating a process to self update according to one embodiment of the invention.

FIG. 4 is a flowchart illustrating a process 400 to self update according to one embodiment of the invention.

At START, the process 400 reads data provided by the source selector 220 (in FIG. 2) (Block 410). Then the process 400 determines if the data is a self-update identifier (Block 420). If not, the process 400 is terminated. If the data matches the self-update identifier, the process 400 reads the program parameters in the next data sequence (Block 430). The program parameters typically include the size of the program data and the erase and write block addresses.

Then the process 400 reads the program data that follows and stores the program data in the read buffer 250 shown in FIG. 2 (Block 440). The process 400 determines if all the program data have been stored in the read buffer (Block 450). If not, the process 400 returns to block 440 to continue to read and store the program data. If all the program data have been stored in the buffer, the process 400 generates a block erase command to the erase control circuit 242 shown in FIG. 2 (Block 460). The process 400 then determines if the erasure has been completed (Block 470). If not, the process 400 returns to block 470 to wait for the completion of the erasing operation. If the erasure is completed, the process 400 generates a write command to the write control circuit 244 shown in FIG. 2 and provides the data from the read buffer 250 in FIG. 2 (Block 480).

Next, the process 400 determines if all the program data stored in the read buffer 250 have been written to the firmware device (Block 490). If not, the process 400 returns to block 480 to continue the update. If all the program data have been written, the process 400 is terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   receiving programming information to update a firmware device containing a boot code in a chipset from a communication interface;
   parsing the programming information into control commands and program data by a parser;
   programming the firmware device based on the control commands by a control logic circuit;
   storing the program data to be written into the firmware device in a buffer; and
   providing the programming information to the parser by a source selector, comprising:
      selecting one of the programming information from the communication interface and an input and output (I/O) data channel by a multiplexer, the I/O data channel being a low pin count (LPC) interface, and
      controlling a selection of the multiplexer by a multiplexer controller.

2. The method of claim 1 wherein programming the firmware device comprises:
   erasing the firmware device by an erase control circuit; and
   writing to the firmware device using the program data in the buffer by a write control circuit.

3. The method of claim 1 wherein the parsing comprises:
   generating the control commands based on the parsed programming information by a state machine, the control commands including at least an erase command and a write command.

4. The method of claim 3 wherein the programming information includes at least a self-update identifier, program parameters, and the program data.

5. The method of claim 4 wherein generating the control commands comprises:
   recognizing the self-update identifier;
   reading the program parameters including at least erase and write addresses;
   generating a buffer write command to write the program data into the buffer;
   generating an erase command to the erase control circuit to a block in the firmware device at the erase address; and
   generating a write command to the write control circuit to the program data in the buffer to the firmware device at the write address.

6. The method of claim 1 wherein receiving comprises:

converting serial data into the programming information by a serial to parallel converter.

7. An apparatus comprising:

a communication interface to receive programming information to update a firmware device containing a boot code in a chipset;

a parser coupled to the communication interface to parse the programming information into control commands and program data;

a control logic circuit coupled to the parser to program the firmware device based on the control commands;

a buffer coupled to the parser to store the program data to be written into the firmware device; and a source selector coupled to the communication interface and the parser to provide the programming information to the parser, comprising:

a multiplexer to select one of the programming information from the communication interface and an input and output (I/O) data channel, the I/O data channel being a low pin count (LPC) interface, and a multiplexer controller coupled to the multiplexer to control a selection of the multiplexer.

8. The apparatus of claim 7 wherein the control logic circuit comprises:

an erase control circuit to erase the firmware device; and a write control circuit to write the firmware device using the program data in the buffer.

9. The apparatus of claim 7 wherein the parser comprises:

a state machine to generate the control commands based on the parsed programming information, the control commands including at least an erase command and a write command.

10. The apparatus of claim 9 wherein the programming information includes at least a self-update identifier, program parameters, and program data.

11. The apparatus of claim 10 wherein the state machine comprises:

a self-update identification state to recognize the self-update identifier;

a program parameters read state coupled to the self-update identification state to read the program parameters including at least erase and write addresses;

a program data buffer state to generate a buffer write command to write the program data into the buffer;

a block erasure state to generate the erase command, the erase command causing the erase control circuit to erase a block in the firmware device at the erase address; and a block write state to generate the write command, the write command causing the write control circuit to write the program data in the buffer to the firmware device at the write address.

12. The apparatus of claim 7 wherein the communication interface includes a serial to parallel converter to convert serial data into the programming information.

13. A system comprising:

a host processor;

a firmware device containing a boot code in a chipset; and a self-update firmware controller coupled to the firmware device to self update the firmware device, the controller comprising:

a communication interface to receive programming information, a parser coupled to the communication interface to parse the programming information into control commands and program data, a control logic circuit coupled to the parser to program the firmware device based on the control commands, a buffer coupled to the parser to store the program data to be written into the firmware device, and a source selector coupled to the communication interface and the parser to provide the programming information to the parser, comprising:

a multiplexer to select one of the programming information from the communication interface and an input and output (I/O) data channel, the I/O data channel being a low pin count (LPC) interface, and a multiplexer controller coupled to the multiplexer to control a selection of the multiplexer.

14. The system of claim 13 wherein the control logic circuit comprises:

an erase control circuit to erase the firmware device; and a write control circuit to write the firmware device using the program data in the buffer.

15. The system of claim 13 wherein the parser comprises:

a state machine to generate the control commands based on the parsed programming information, the control commands including at least an erase command and a write command.

16. The system of claim 15 wherein the programming information includes at least a self-update identifier, program parameters, and program data.

17. The system of claim 16 wherein the state machine comprises:

a self-update identification state to recognize the self-update identifier;

a program parameters read state coupled to the self-update identification state to read the program parameters including at least erase and write addresses;

a program data buffer state to generate a buffer write command to write the program data into the buffer;

a block erasure state to generate the erase command, the erase command causing the erase control circuit to erase a block in the firmware device at the erase address; and a block write state to generate the write command, the write command causing the write control circuit to write the program data in the buffer to the firmware device at the write address.

18. The system of claim 13 wherein the communication interface includes a serial to parallel converter to convert serial data into the programming information.

* * * * *